Nov. 27, 1962   J. A. LINDSTROM   3,066,226
MEASURING APPARATUS
Filed Aug. 18, 1959
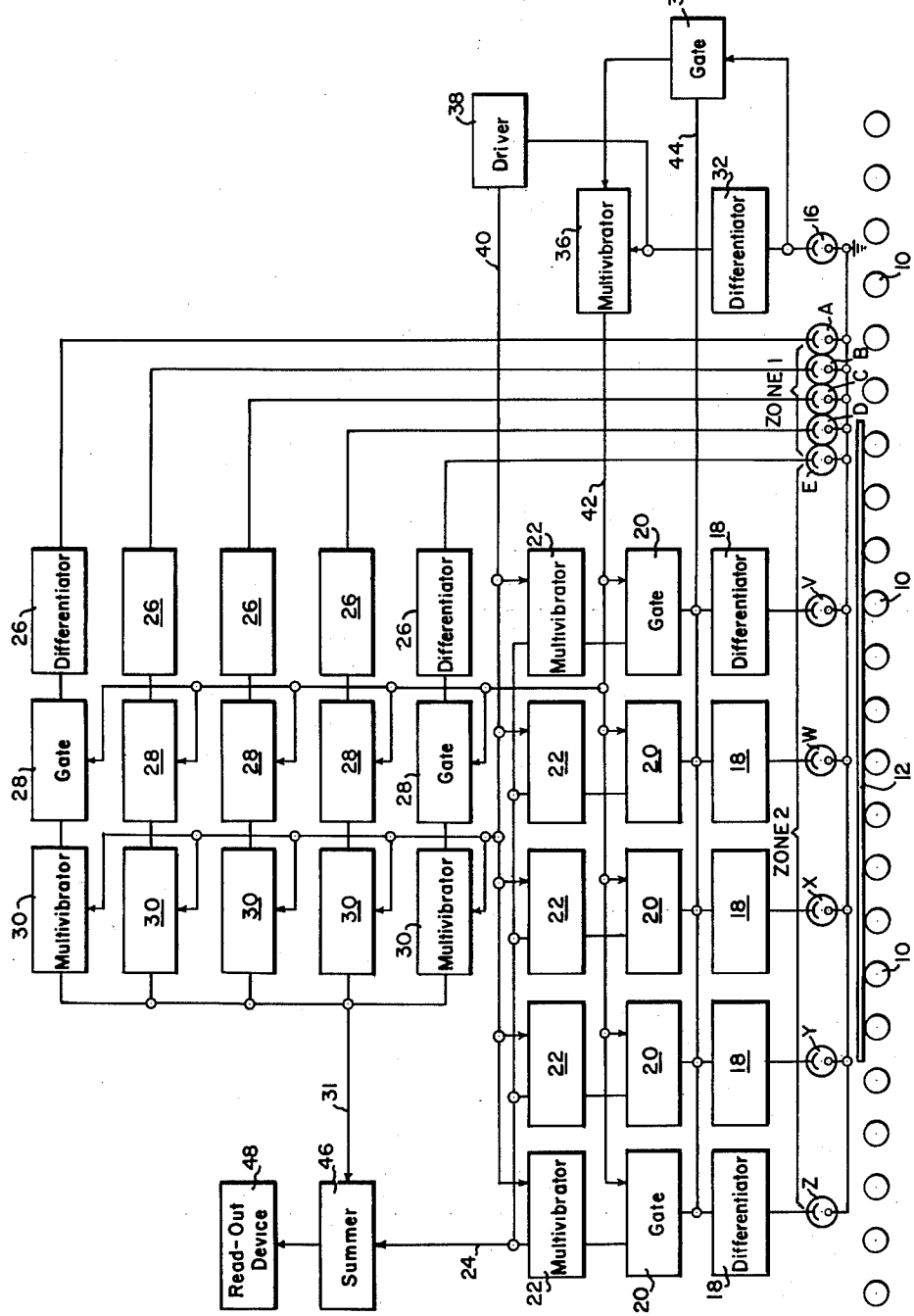
INVENTOR
John A. Lindstrom
BY
ATTORNEY United States Patent Office 3,066,226
Patented Nov. 27, 1962

3,066,226
MEASURING APPARATUS
John A. Lindstrom, Pittsburgh, Pa., assignor to Jones & Laughlin Steel Corporation, Pittsburgh, Pa., a corporation of Pennsylvania
Filed Aug. 18, 1959, Ser. No. 834,506
6 Claims. (Cl. 250—222)

This invention relates to apparatus for measuring an edge-to-edge dimension of an article, and more particularly to a noncontacting measuring device for moving articles in which photoelectric cells are employed to sense the leading and trailing edges of an article as it traverses a path of travel.

The present invention has as its primary object the provision of means for automatically measuring the length of a moving object. Although not limited thereto, the invention is particularly adapted for use in measuring the length or other dimension of a moving hot steel slab or the like where the measuring apparatus must not come into contact with the article being measured.

As will become apparent from the following detailed description, the invention employs a plurality of photoelectric cells positioned adjacent the path of travel of an object which is to be measured. If the object is hot and irradiant, each photoelectric cell will produce a rise in voltage when the leading edge of the object passes thereby; likewise, when the trailing edge of the object passes each photoelectric cell, its output voltage will fall. However, if the object itself is not irradiant so as to provide the required light to actuate the photoelectric cells, external light sources may be used to supply the required illumination. The photoelectric cells are divided into two groups, in the first of which the cells are evenly spaced close to each other. This first group is initially contacted by the moving object in its path of travel. In the second group which follows the first group in the path of travel of the object to be measured, the photoelectric cells are spaced apart by an amount equal to the total length of the first group. Thus, if the object to be measured is positioned adjacent the photoelectric cells so that its leading edge is directly in front of one of the photoelectric cells in the second group, whereas its trailing edge is in front of one of the cells in the first group, the sum of the voltages produced by the photoelectric cells in the second group will be a function of the length of the article in one increment; while the sum of the voltages received from the photoelectric cells in the first group will be a function of the remaining length of the article in smaller increments over and above that measured by the second group of photoelectric cells. The total voltages from the first and second groups are then applied to electrical circuitry which converts them into a visual indication of length.

Another object of the invention is to provide a noncontacting length measuring device in which the accuracy of the length measurement may be easily varied to suit requirements.

The above and other objects and features of the invention will become readily apparent from the following detailed description taken in connection with the accompanying single FIGURE drawing which schematically illustrates one embodiment of the invention.

Referring to the drawing, the particular embodiment of the invention shown includes a conveyor comprising a plurality of spaced rollers 10 which support an irradiant, hot steel slab 12 for movement therealong. Spaced along the conveyor and closely adjacent thereto are a plurality of photoelectric cells which are divided into two groups identified, respectively, as zone 1 and zone 2. The photoelectric cells A–E in the first group or zone 1 are equally spaced relatively close together; whereas those in zone 2, V–Z, are equally spaced relatively wide apart. It will be noted that the length of zone 1 is equal to the spacing between successive photoelectric cells in zone 2. Furthermore, the spacing between photoelectric cells in zone 2 is less than the minimum length to be measured. If it is assumed that the length between cells in zone 2 is five feet, then the spacing between those in zone 1 will be one foot for the illustration given. Positioned ahead of the photoelectric cells in zone 1 is a single photoelectric cell 16, substantially as shown, for the purpose of insuring that the trailing end of the object to be measured is in zone 1 before a length measurement is taken.

The current through each of the photoelectric cells will increase as the intensity of light upon its cathode increases. Thus, as the leading edge of the irradiant slab 12 passes by each of the photoelectric cells, it will produce a rise in voltage. It will be noted that each of the photoelectric cells in zone 2 has its output connected to a differentiator 18. As is well known to those skilled in the art, a differentiator is a circuit in which the voltage amplitude at the output is proportional at any instant to the rate of change of voltage amplitude at the input. Therefore, when the voltage output of any one of the photoelectric cells in zone 2 changes as the leading edge of slab 12 passes thereby, the differentiator 18 will produce a sharp voltage pulse of short duration. This sharp voltage pulse is applied through gate 20 to a bistable multivibrator 22. Multivibrator 22, well known in the art, is a circuit including two electron valves, one of which conducts while the other is cut off, and vice versa. The bistable multivibrator possesses two conditions of stable equilibrium. One condition may be called the "on" condition; whereas, the other condition may be called the "off" condition when the state of conduction of the electron valves is reversed. When the multivibrator 22 is "on," it will produce a rise in voltage on lead 24; whereas, when the multivibrator is "off," the output voltage on lead 24 will fall. The multivibrator may be switched from one stable state to the other by a short voltage pulse. Thus, if the multivibrator 22 is initially "on," an applied pulse may switch the multivibrator to the "off" condition. Similarly, when the multivibrator is in the "off" condition, another sharp voltage pulse may switch it back to its "on" condition to produce a rise in voltage on lead 24.

As was the case with the photoelectric cells in zone 2, the cells in zone 1 are also each connected to a differentiator 26 which produces a sharp output pulse of short duration when the leading edge of the slab 12 passes thereby. In the case of the leading edge of slab 12, the voltage at the output of each photoelectric cell in zone 1 will increase, thereby producing a positive short pulse at the output of differentiator 26. When, however, the trailing edge of slab 12 passes the photoelectric cells in zone 1, the voltage of the photoelectric cells will fall, whereby the differentiators 26 will produce short negative pulses at their outputs. These pulses are applied through gates 28 to bistable multivibrators 30 which are similar to multivibrators 22 already described.

The multivibrators 22 are designed so that a positive pulse from differentiators 18 will switch the multivibrator from its "off" condition to its "on" condition. That is, the positive pulse from the differentiator is applied to the normally nonconducting electron valve in the multivibrator. Similarly, each multivibrator 30 is designed whereby the pulse from differentiator 26 is applied to the normally nonconducting electron valve so that a positive pulse from differentiator 26 will switch these multivibrators from their "off" condition to their "on" condition. In order to switch each multivibrator 30 from its "on" condition to its "off" condition, it is necessary that a negative pulse be supplied from its associated differentiator 26. This is accomplished in the manner described above when the trailing edge of the slab passes each cell in zone 1.

The photoelectric cell 16 is connected to a differentiator 32, similar to that already described, as well as to a gate circuit 34. The output of differentiator 32, being a short pulse of one polarity or the other depending upon whether the leading or trailing edge of slab 12 passes thereby, is applied to a bistable multivibrator 36 as well as a driver circuit 38. Positive output pulses from differentiator 32 will cause multivibrator 36 to switch from its "on" condition to its "off" condition and will actuate driver 38 to produce an output voltage on lead 40. This output voltage is used to reset each of the multivibrators 22 and 30 to its "off" condition. A negative short voltage pulse from differentiator 32 when the trailing edge of slab 12 passes photoelectric cell 16 will switch multivibrator 36 from its "off" condition to its "on" condition, whereby it will apply a voltage via lead 42 to each of the gate circuits 20 and 28. This voltage will disable the gate circuits to prevent further signals at the outputs of differentiators 18 and 26 from reaching multivibrators 22 and 30, respectively. The output voltage of photoelectric cell 16 is also applied to gate circuit 34 together with the outputs of differentiators 18 on lead 44. When the slab 12 is beneath photoelectric cell 16 and its voltage rises, the gate 34 blocks passage of signals from differentiators 18 to multivibrator 36. When, however, the trailing edge of the slab 12 passes the photoelectric cell 16, its output voltage will fall, whereby the voltage pulse from the differentiator 18 for the next photoelectric cell in zone 2 which is passed by the leading edge of slab 12 will be applied through gate 34 to switch multivibrator 36 from its "off" condition to its "on" condition and thereby apply a voltage on lead 42 to disable gate circuits 20 and 28.

The output voltages from multivibrators 22 and 30 on leads 24 and 31, respectively, are applied to a summing circuit 46 which will, in effect, add the voltages received from multivibrators 22 on lead 24 and those received from multivibrators 30 on lead 31. Multivibrators 22 will each produce a 1 volt rise on lead 24 when they are "on"; whereas, multivibrators 30 will each produce a 0.2 volt rise on lead 31, or one-fifth the voltage rise produced by multivibrators 22. The voltage output of each of the multivibrators 22 is thus a measure of distance between cells in zone 2; whereas, the output of each multivibrator 30 is a measure of the increment between cells in zone 1. The total voltages from summing circuit 46 are then applied to a read-out device 48 which gives a visual indication of the length of slab 12.

In operation, when the leading edge of the slab 12 initially passes photoelectric cell 16, the output voltage of this cell will increase whereby differentiator 32 will produce a positive output voltage pulse of short duration. This positive output voltage pulse switches multivibrator 36 from its "on" condition to its "off" condition, whereby the voltage on lead 42 falls and the gates 20 and 28 are enabled to pass signals from differentiators 18 and 26 to multivibrators 22 and 30, respectively. Similarly, the positive voltage pulse from differentiator 32 is applied to driver 38 which produces an output voltage on lead 40 to switch each of the multivibrators 22 and 30 from its "on" condition to its "off" condition. It will be understood that if one or more of the multivibrators 22 or 30 is already in its "off" condition, the voltage on lead 40 will not affect its operation, the net result being to insure that all multivibrators are in "off" condition at the beginnnig of the cycle when the leading edge of slab 12 initially passes photoelectric cell 16.

As the leading edge of the slab 12 passes each of the cells in zone 1, the output voltage of the respective cells will increase. Consequently, differentiators 26 will produce positive output voltage pulses which are applied through gates 28, which are now open, to multivibrators 30 which are in "off" condition. This action causes each of the multivibrators to switch from its "off" condition to its "on" condition in succession as the leading edge of slab 12 passes the respective photoelectric cells in zone 1.

As the leading edge of slab 12 passes each photoelectric cell in zone 2, the output voltage of the photoelectric cell will rise, thereby producing an output voltage pulse of positive polarity at the output of differentiator 18. Since gates 20 are now open, this positive voltage pulse will be passed to multivibrator 22 which will switch from its "off" condiiton to its "on" condition. This process will continue with each multivibrator 22 turning "on" in succession until the trailing edge of the slab 12 passes photoelectric cell 16. At this time the output voltage of photoelectric cell 16 will decrease whereby differentiator 32 will produce a negative output voltage pulse, which has no effect on multivibrator 36, and gate 34 will be enabled to pass output pulses from differentiators 18 to multivibrator 36. Thus, after the trailing edge of the slab passes photoelectric cell 16, the next pulse received from any one of the differentiators 18 will switch multivibrator 36 from its "off" condition to its "on" condition to close gates 20 and 28. In the embodiment shown in the drawing it will be assumed that the trailing edge of slab 12 passed photoelectric cell 16 after the leading edge of the slab passed the third photoelectric cell X in zone 2, but before it reached the fourth photoelectric cell Y. Thus, multivibrator 36 will not be actuated to disable gates 20 and 28 until the leading edge of the slab 12 travels to the fourth photoelectric cell Y in zone 2. As the slab travels along the conveyor after its trailing edge passes photoelectric cell 16 but before the leading edge reaches cell Y in zone 2, the trailing edge will pass a certain number of photoelectric cells in zone 1. Thus, the voltage levels of these photoelectric cells will fall to produce negative voltage pulses at the outputs of differentiators 26. These negative voltage pulses will then actuate multivibrators 30 to switch from their "on" conditions to their "off" conditions.

This action will, of course, continue until the leading edge of slab 12 reaches the fourth photoelectric cell Y in zone 2, whereupon the gates 20 and 28 will be disabled and no further signals from the photoelectric cells in either zone 1 or zone 2 can affect the voltages on leads 24 and 31. It can be seen that since the leading edge of slab 12 passed the photoelectric cells V, W, X and Y in zone 2, four voltage rises of 1 volt each were produced on lead 24. Similarly, the trailing edge of slab 12 passed three photoelectric cells A, B and C in zone 1 before gates 20 and 28 were closed. This left only two of the multivibrators 30 in "on" condition to produce two voltage rises on lead 31 of 0.2 volt each. The total length of the slab 12 in five-foot increments is, therefore, proportional to the total number of voltage rises of one volt each appearing on lead 24; and the additional length of the slab in one-foot increments is a function of the number of voltage rises of 0.2 volt each appearing on lead 31. In the example given, the total voltage fed to the summer 46 will be 4.4 volts, meaning that the length of the slab is 22 feet. The voltages from summer 46 are then applied to read-out device 48 to indicate the length of slab 12 in feet with an accuracy of plus or minus three inches. This accuracy, of course, depends upon the incremental spacing of the photoelectric cells in zone 1, which can be designed to suit particular needs.

Although the invention has been shown in connection with a certain specific embodiment, it will be readily apparent to those skilled in the art that various changes in form and arrangement of parts may be made to suit requirements without departing from the spirit and scope of the invention. In this respect it is apparent that if slab 12 is not irradiant, light sources may be located above the conveyor whereby the light will be reflected from the surface of the slab to each photoelectric cell as the slab passes thereby. As an alternative, light sources could be positioned beneath the conveyor whereby the light source to each photoelectric cell would be interrupted as the leading edge of the slab passes to change the output voltage of the cell. Furthermore, the particular electrical circuit shown herein is illustrative only, it being understood that other and different circuits may be devised to convert the signals from the photoelectric cells into a visual indication of length. It should also be apparent that if the slab or other workpiece is stationary, the photoelectric cells themselves may be moved over the workpiece to accomplish a measurement.

I claim as my invention:

1. Apparatus adapted to measure the length of a moving article comprising a first plurality of spaced sensing devices positioned adjacent the path of travel of said article at equal intervals, a second plurality of spaced sensing devices positioned adjacent the path of travel of said article at equal intervals which are shorter than the intervals separating said first plurality of devices, said second plurality of devices being located ahead of the first plurality of devices in the path of travel of said article and covering a distance along the path of travel equal to the interval between successive devices in the first plurality, a single sensing device positioned adjacent said path of travel ahead of the second plurality of devices, each of said sensing devices being adapted to produce an electrical signal when the leading or trailing edge of said article passes thereby, and means operable when the leading edge of the article reaches a sensing device in the first plurality of devices after its trailing edges passes said single sensing device for indicating the length of said article in response to signals from the devices in said first and second pluralities between said leading and trailing edges.

2. Apparatus adapted to measure the length of a moving article comprising a first plurality of photoelectric cells positioned adjacent the path of travel of said article at equal intervals, a second plurality of photoelectric cells positioned adjacent the path of travel of said article at equal intervals which are shorter than the intervals separating said first plurality of cells, said second plurality of cells being located ahead of the first plurality of cells in the path of travel of said article and separated therefrom by an amount equal to the distance between successive cells in the first plurality, said second plurality of cells covering a distance along the path of travel equal to the interval between successive cells in the first plurality, a single photoelectric cell positioned ahead of said second plurality of cells in the path of travel of said article, and means operable after the trailing edge of said article passes said single photoelectric cell for indicating the length of said article between a cell in said first plurality and a cell in the second plurality in response to signals received from the photoelectric cells between the leading and trailing edges of the article.

3. Apparatus adapted to measure the length of a moving article comprising a first plurality of photoelectric cells positioned adjacent the path of travel of said article at equal intervals, a second plurality of photoelectric cells positioned adjacent the path of travel of said article at equal intervals which are shorter than the intervals separating said first plurality of cells, said second plurality of cells being located ahead of the first plurality of cells in the path of travel of said article, circuit means associated with each photoelectric cell in the first plurality of cells for producing a first voltage when a portion of the article is positioned adjacent thereto, circuit means associated with each photoelectric cell in the second plurality of cells for producing a second voltage when a portion of the article is positioned adjacent thereto, and means for adding the first and second voltages produced by the aforesaid circuit means to determined the length of said article.

4. Apparatus adapted to measure the length of a moving article comprising a first plurality of photoelectric cells positioned adjacent the path of travel of said article at equal intervals, a second plurality of photoelectric cells positioned adjacent the path of travel of said article at equal intervals which are shorter than the intervals separating said first plurality of cells, said second plurality of cells being located ahead of the first plurality of cells in the path of travel of said article and covering a distance along the path of travel equal to the interval between successive cells in the first plurality of cells, circuit means associated with each of said photoelectric cells in the first plurality of cells for producing a voltage when a portion of the article is positioned adjacent thereto, circuit means associated with each of the photoelectric cells in said second plurality of cells for producing a voltage when a portion of the article is positioned adjacent thereto, means for adding the voltages produced by the aforesaid circuit means, a single photoelectric cell positioned in the path of travel of said article ahead of said second plurality of cells, and means responsive to a signal produced by a photoelectric cell in said first plurality together with the signal produced by said single photoelectric cell after the trailing edge of said article passes thereby for rendering said circuit means inoperative.

5. Apparatus adapted to measure the edge-to-edge dimension of an article comprising a first plurality of longitudinally spaced article sensing devices, a second plurality of longitudinally spaced article sensing devices positioned at one end of said first plurality of devices, the spacing between the devices in the second plurality being less than the spacing between the devices in the first plurality, each of said sensing devices in the first plurality being adapted to produce a voltage of a predetermined magnitude when an article to be measured is adjacent thereto, each of said sensing devices in the second plurality being adapted to produce a voltage having a magnitude less than said predetermined magnitude when an article to be measured is adjacent thereto, and circuit means for adding the voltages produced by said devices for indicating the length of an article adjacent the devices when the leading edge of one of its dimensions is immediately adjacent one of the devices in said first plurality and the trailing edge of the same dimension is positioned between the first and last devices in said second plurality of devices.

6. The apparatus claimed in claim 5 wherein the difference in the magnitudes of the voltages produced by the devices in the first and second pluralities is proportional to the difference in spacing between the devices in the first and second pluralities, respectively.

References Cited in the file of this patent

UNITED STATES PATENTS

| | | |
|---|---|---|
| 1,998,950 | Cockrell | Apr. 23, 1935 |
| 2,049,332 | Snyder | July 28, 1936 |
| 2,528,770 | Meincke | Nov. 7, 1950 |
| 2,828,917 | Wheeler | Apr. 1, 1958 |
| 2,916,633 | Stone et al. | Dec. 8, 1959 |
| 2,941,086 | Gottschall et al. | June 14, 1960 |